United States Patent Office 3,099,879
Patented Aug. 6, 1963

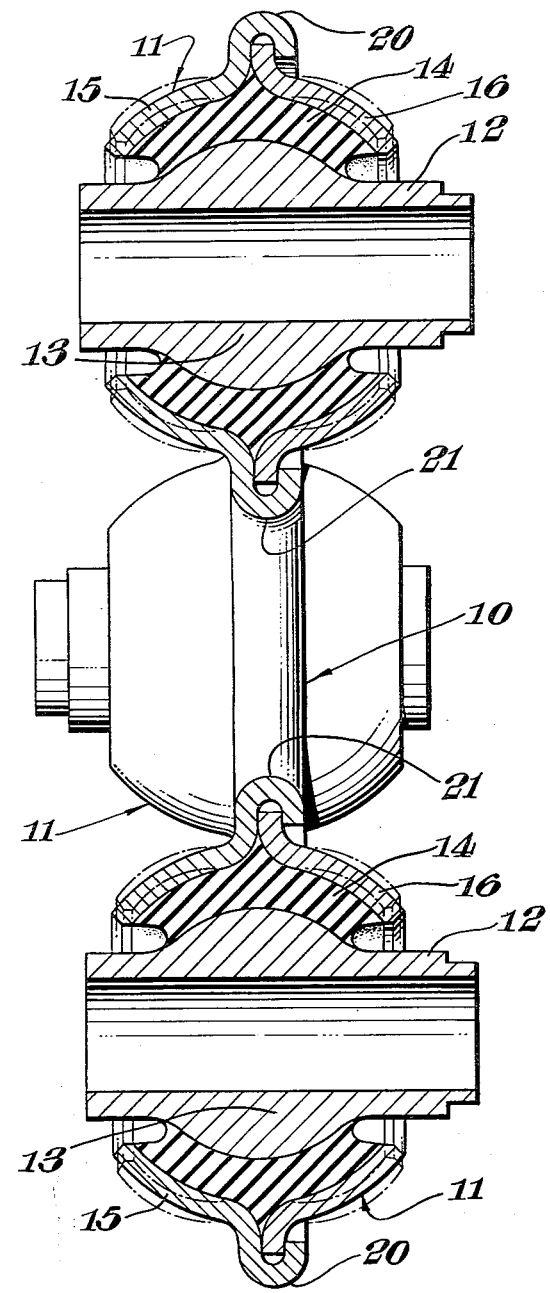

3,099,879
METHODS OF MANUFACTURING BALL JOINTS AND UNIVERSAL COUPLINGS EMPLOYING SUCH BALL JOINTS
Marcus Horovitz, Leicester, England, assignor to Metalastik Limited, Leicester, England, a British company
Filed May 1, 1961, Ser. No. 106,919
Claims priority, application Great Britain June 2, 1960
3 Claims. (Cl. 29—436)

The invention concerns a method of manufacturing a universal coupling, hereinafter referred to as of the kind described, for a motor vehicle transmission and comprising a disc member with two sets of two ball joints one set for connecting a driving member of the transmission with the disc member on one diameter of the disc member and the other set for connecting the disc member with a driven member of the transmission on a diameter at right angles to said one diameter, each ball joint comprising an inner member with a ball-like part and a housing which envelops the ball-like part with a layer of rubber or the like resilient material hereinafter referred to as the rubber layer precompressed between the ball-like part and the housing.

It is known that universal couplings of the kind described have a large torque capacity compared with other kinds of universal coupling of equivalent size. It has been found however that when subjected to excess torque more especially although not necessarily under conditions of more acute angular misalignment than normally contemplated and as may occur for example in the half shaft drive connection of an independently sprung driving wheel of a motor vehicle, the rubber layers of the ball joints tend, if not bonded to the housing of the joints as has hitherto been the case, to slip round in the housings so that the rubber becomes displaced and the inner ball-like parts forced off centre in the housings. This gives rise to undesirable out of balance forces during rotation of the coupling.

An object of the invention is to provide an improved method of manufacture whereby such disadvantages are overcome.

A method of making a universal coupling of the kind described, employing a specific method according to the present invention, will now be described merely by way of example with reference to the accompanying drawing which is a cross-section of the finished coupling showing in chain dotted line a step in the manufacture of the coupling.

The FIGURE is an elevational view with parts in section of a universal coupling.

Referring to the drawing, the coupling comprises an annular disc member 10 having at four points spaced uniformly around the member on a common pitch circle four ball joints generally indicated at 11. Each ball joint comprises a hollow rod-like inner member 12 having a part-spherical protuberance 13, i.e. a ball-like part on to which is bonded a layer of rubber 14. The rubber layer 14 is in the present example, although not necessarily, of uniform thickness, and is externally spherical being bonded within a housing composed of two part-spherical cup-like portions 15, 16 of the annular member 10, the cup portions 15, 16 enveloping the protuberance 13 and compressing the rubber layer 14 against the protuberance.

The annular disc member 10 is formed by two annular metal discs secured together face to face by spinning or swaging over the outer and inner peripheral edge parts of one of the discs, the left-hand disc in the drawing, as at 20 and 21 respectively. Alternatively the discs may be bolted, rivetted or spot welded together face to face or otherwise connected together in any convenient manner.

The cup-like portions 15, 16 of each ball joint are in the present example formed as pressings in the two metal discs respectively.

Initially, the cup-like portions 15, 16 are formed with a configuration as shown in chain dotted lines for the cup-like portions at the top and bottom in the drawing. That is to say, the wall of each cup-like portion is initially given a form such that in the direction away from the joined faces between the discs it is displaced progressively outwardly from an imaginary part-spherical surface centred at a point in the joined faces on the intended axis of the rod member of the joint. In the drawing this imaginary part-spherical surface corresponds with the inner surface of the finished cup-portion as shown in the drawing.

The two discs are assembled and secured together to form the disc member 10 as shown, with a rod-like inner member 12 within each pair of cup-like portions, the cup-like portions enclosing the protuberance on the rod-like member.

The member 10 and the rod-like members are then supported with the protuberances on the rod-like members located centrally and in their required orientation within the housings formed by the pairs of cup-like portions.

Unvulcanised rubber is then forced into the space between each protuberance and its enclosing housing so as to fill the space. The rubber is then cured causing the moulded rubber layer in the space to bond to the protuberance and to both cup-like portions forming the housing, any known technique being used for this purpose.

Finally the cup-like portions are reduced in size by swaging to their final form as shown in full lines in the drawing thereby to relieve the tension in the rubber layer due to the bonding and to pre-compress the rubber layer.

The swaging operation of each pair of cup-like portions locally compresses the rubber layer within the cups, but the compression forces are transmitted throughout the body of rubber so that the rubber layer becomes equally, radially pre-compressed throughout.

The cup-like portions 15, 16 may be initially part-spherical adjacent the joined faces of the annular discs making up the member 10, the remaining wall part of each cup-like portion being displaced, in the direction away from the joined faces, progressively outwardly from a part-spherical surface having the same radius and centre as the part of the cup-like portion adjacent the joined faces.

In this case only the non-spherically formed parts of the cups are displaced by the swaging operation to pre-compress the bonded rubber layers.

Again, the cup-like portions 15, 16 may initially be part-spherical throughout but oversize. In this case the cup-like portions are reduced in size throughout, for example by swaging, in order to pre-compress the bonded rubber layer, the part-spherical form being retained during the size reducing operation.

Instead of reducing the size of the cup-like portions 15, 16 by an amount sufficient to give the required pre-compression in the rubber layers 14, a partial pre-compression or a relieving of the bonding tension in the rubber layers may be achieved in this way the rubber layers being then further compressed, to give the required pre-compression in the rubber layers, by expanding the rod-like inner members 12 and therefore the protuberance 13, for example by passing a drift through the rod-like inner members.

I claim:
1. A method of manufacturing a universal coupling of the kind described comprising the steps of
(a) preforming four equally spaced cup-like portions relatively close together in a circle and correspondingly in each of two separate metal discs of appropriately heavy gauge,
(b) uniting said discs face to face to constitute the coupling disc member and with corresponding cup-like portions aligned in pairs to constitute four housings,
(c) supporting a ball-like part in a required position and orientation within each such housing and spaced all around therefrom,
(d) forcing unvulcanised rubber into the space between each housing and ball-like part so as to fill the space,
(e) curing the rubber in such spaces so as to cause the moulded rubber layers to become bonded to the housings and the ball-like parts, and
(f) reducing the size of the housings by deforming the material of both cup-like portions of each housing to a limited extent just sufficient to relieve the tension in the rubber layers due to the bonding and to give the required precompression in the rubber layers.

2. A method according to claim 1 wherein each cup-like portion is initially formed part-spherical and a similar configuration is maintained during the size-reducing operation.

3. A method according to claim 1 wherein each cup-like portion is initially formed part-spherical adjacent the disc, the remaining wall part of said portion being displaced, in the direction away from the disc, progressively outwardly from a part-spherical surface having the same radius and centre as said part-spherical form, and during the size-reducing operation the non-spherically shaped part is deformed into the spherical shape.

References Cited in the file of this patent
UNITED STATES PATENTS

| | | |
|---|---|---|
| 1,867,540 | Rosenberg | July 12, 1932 |
| 1,898,100 | Skillman | Feb. 21, 1933 |
| 2,407,559 | Krotz | Sept. 10, 1946 |
| 2,628,416 | Sampson | Feb. 17, 1953 |